(12) United States Patent
Hochmuth

(10) Patent No.: US 6,212,965 B1
(45) Date of Patent: Apr. 10, 2001

(54) SHIFTABLE CLAMPING-TYPE LOCKING MECHANISM

(75) Inventor: Harald Hochmuth, Hagenbüchach (DE)

(73) Assignee: Ina Wälzlager Schaeffler OHG, Herzogenaurach (DE)

( * ) Notice: Subject to any disclaimer, the term of this patent is extended or adjusted under 35 U.S.C. 154(b) by 0 days.

(21) Appl. No.: 09/234,567

(22) Filed: Jan. 20, 1999

(30) Foreign Application Priority Data

Jan. 30, 1998 (DE) .............................................. 198 03 448

(51) Int. Cl.$^7$ ................................ F16N 41/10; B60N 2/22
(52) U.S. Cl. ................... 74/144; 74/156; 192/15; 297/367
(58) Field of Search ............................. 74/144, 145, 146, 74/156, 157; 192/15; 297/367

(56) References Cited

U.S. PATENT DOCUMENTS 3,958,828 * 5/1976 Ishida et al. ......................... 297/355
4,538,856 * 9/1985 Katsumoto et al. ................. 297/367
5,865,285 * 2/1999 Minkenberg et al. ................ 192/15

FOREIGN PATENT DOCUMENTS

WO 96/20352    7/1996   (WO) .

* cited by examiner

Primary Examiner—David Fenstermacher
(74) Attorney, Agent, or Firm—Henry M. Feiereisen

(57) ABSTRACT

A shiftable clamping-type locking mechanism, includes two track-defining elements and a plurality of clamping members, e.g. rollers or balls, arranged between the tracks of the elements and so spring-biased as to seek a clamped position. The clamping members are shiftable by a control unit from the clamped position into a release position in which the clamping members are liberated from the tracks so that the two elements can be freely moved relative to one another. A coupling unit positively connects the two elements to one another in order to prevent an undesired slip between the elements.

14 Claims, 2 Drawing Sheets

SHIFTABLE CLAMPING-TYPE LOCKING MECHANISM

CROSS-REFERENCES TO RELATED APPLICATIONS

This application claims the priority of German Patent Application Serial No. 198 03 448.2, filed Jan. 30, 1998, the subject matter of which is incorporated herein by reference.

BACKGROUND OF THE INVENTION

The present invention relates to a shiftable clamping-type locking mechanism, and in particular to a locking mechanism used in gearboxes for adjusting a seat position of a car seat.

In general, clamping-type locking mechanism of this type are used to secure the position between two elements. When releasing a locking mechanism, both elements can be moved in directions that have been previously locked. The locking mechanism is provided with tracks between which clamping members are positioned and so spring-loaded against these tracks as to seek a clamped position. The tracks may, for example, be formed on opposing outer cylindrical surface areas of both elements. It is also conceivable to design the tracks along confronting sides of longitudinally displaceable elements. Locking mechanisms of this type may be installed, for example, in gearboxes in which a shaft should be securely fixed in both directions of rotation. Such gearboxes are used, for example in seat adjustments of motor vehicles or in mechanisms for raising and lowering windows in motor vehicles.

International patent publication WO 96/20352 discloses a clamping-type locking mechanism for adjusting the seat position of a seat. The locking mechanism includes two elements nested within its other, with the outer element forming a cylindrical track about its inner surface area, and with the inner element being provided with several circumferentially spaced ramps extending about the outer surface area in opposition to the cylindrical track and inclined in opposite directions. Each ramp forms with the cylindrical track a wedge-shaped clamping gap in which a clamping roller is positioned under spring tension. As the imaginary peaks of the wedge-shaped clamping gap either face one another or, as in this case, face away from one another, the clamping rollers positioned under spring tension in the clamping gap prevent a rotation of the inner element relative to the outer element in both directions of rotation. When the clamping rollers are released and thus in cleared position, only those clamping rollers are actually freed which are functionally relevant for this direction of rotation. The clamping rollers are arranged in pockets of a cage at clearance in circumferential directions, whereby the cage can be slightly pivoted relative to the inner element. This pivot path is utilized for releasing the clamping rollers from their pertaining clamping gaps. A torque acts on the inner element and is effected by a force impacting on the seat. In the clamping situation, these types of locking mechanisms retain the seat at a set level.

These types of locking mechanisms are however subject not only to static torque in their clamped position but also to oscillating, dynamic loads with changing torque. In such a changing load, the clamping force, which is transmitted from the inner element via the clamped rollers into the outer element, is initially reduced in the conventional locking mechanism, until the changing load reaches a value at least approximating zero. Although in this stage, the clamping rollers are still resiliently received in their clamping gap by means of the provided springs; However, relative movements between the inner element and the outer element are possible because of the reduced clamping action as a result of the changing load. Thus, an undesired slip may be caused. In case of a seat adjustment, such relative movements result in an unintended change of the seat level.

SUMMARY OF THE INVENTION

It is thus an object of the present invention to provide an improved clamping-type locking mechanism, obviating the afore-stated drawbacks.

In particular, it is an object of the present invention to provide an improved clamping-type locking mechanism, in which a slip between clamped elements is positively eliminated.

These objects, and others which will become apparent hereinafter, are attained in accordance with the present invention by providing a plurality of clamping members, e.g. rollers or balls, arranged between confronting tracks of two elements and so spring-biased as to seek a clamped position, a control unit which acts on the two elements for moving the clamping members from the clamped position into a release position in which the clamping members are liberated from the tracks so that the elements are freely movable relative to one another; and a coupling unit for detachably connecting both elements in a form-fitting manner.

Through the provision of an additional coupling unit, the locking mechanism according to the present invention can be operated without experiencing an undesired slip between both elements. The coupling unit can be dimensioned for small loads as the loads are predominantly transmitted via the locking mechanism. Only in circumstances when dynamic or changing loads reach or pass the value zero is the coupling unit subject to these small dynamic loads, preferably at zero crossing. The form-fitting engagement of both elements to one another is then able to positively eliminate undesired slip between the two elements.

The coupling unit is preferably disengaged when the clamping members occupy their release position and thus are liberated from the tracks. An adjustment of both elements relative to one another is then possible in a manner known per se. The coupling unit is engaged when the clamping members occupy their clamped position and thus are in engagement with the tracks.

According to another feature of the present invention, an actuating device is provided for operating the control unit and the coupling unit. In a neutral position of the actuating device, the clamping members are arranged in their clamped position, with the coupling unit being engaged. An actuating device of this type can be designed in many ways to initially engage the coupling unit and to subsequently liberate the clamping members to occupy their release position, when operating the actuating device in an actuating direction.

Advantageously, the coupling unit can be realized in a particularly simple manner by providing the one element with a first tooth profile and the other element with a second tooth profile, with both tooth profiles being displaceable relative to one another for effecting a tooth engagement. Suitably, the first element includes a shaft and a gear which represents the tooth profile of the first element and is so secured on the shaft that the gear is prevented from executing a rotation relative to the shaft but is able to move in axial direction relative to the shaft. The other element is then provided with the second tooth profile, with the shaft being rotatably mounted with respect to the other element. The coupling unit is engaged when the gear is so axially displaced as to mesh with the second tooth profile. When the gear is axially shifted along the shaft and dissociated from the second tooth profile, the coupling unit is disengaged.

Preferably, the coupling unit is operated by an actuating mechanism which includes a rotatably mounted actuator, whereby an indexing mechanism is positioned between the actuator and the gear for converting a rotational movement of the actuator into an axial movement of the gear for engaging and disengaging the coupling unit. The conversion of the rotational movement into an axial movement may be realized by providing the actuator with a cam surface for support of the gear, with the cam surface including at least one ramp and a support area following the ramp, whereby the ramp is inclined in rotational direction of the actuator with respect to a plane in which rotations of the actuator take place, and the support area extends parallel to the plane. When turning the actuator relative to the gear, the gear glides initially with its contact surface along the cam surface, i.e. along the sloped ramp and subsequently along the support area. When situated in the region of the support area of the cam surface, the gear of the one element has been shifted in axial direction to such an extent as to detach from the second tooth profile of the other element.

According to yet another feature of the present invention, the indexing mechanism may include at least one intermediate member, e.g. a ball, which is interposed between the gear and the cam surface, so that the gear is urged against the cam surface via the ball. Preferably, the other element is formed with a bore for receiving the ball, with the ball lying against the cam surface and the gear. When being operated, the actuator pivots relative to the other element and thus relative to the ball, with the cam surface moving along the ball. In the phase during which the ramp passes by the ball, the ball is shifted in axial direction. As the ball bears against the gear, a conjoint axial displacement of the gear is realized, resulting in a disconnection of the gear from the tooth profile of the other element.

Suitably, a helical compression spring extends between the shaft and the gear for loading the gear against the actuator. This ensures a permanent contact of the gear with the cam surface.

The locking mechanism according to the present invention is especially suitable for a configuration in which the one element is so mounted as to rotate relative to the other element about a pivot axis, whereby the track of the other element is of cylindrical configuration and positioned concentrically to the pivot axis, and the track of the one element is formed by circumferentially spaced clamping ramps positioned in opposition to the track of the other element. The clamping members are retained in a rotatable cage and positioned under spring tension in wedge-shaped clamping gaps bounded by the ramps of the one element and the track of the other element. Thus, a rotation of the cage moves the clamping members from the clamped position into the release position. Preferably, the actuator is linked to the cage for realizing a conjoint rotational movement. In such locking mechanisms, the clamping rollers are arranged in the pockets of the cage at clearance in circumferential direction. When operating the actuating device, the coupling unit is disengaged in a manner as described above, whereby the rotation of the actuator needed for this action is smaller than the clearance of the clamping rollers in circumferential direction. Overlapping between the travel of the turned actuator for disengaging the coupling unit and the switching path for releasing the clamping rollers is possible. The coupling unit is already disengaged when further turning the actuator, and the cage pushes the clamping rollers out of their wedge-shaped clamping gaps. In this phase, a relative rotation of both elements is possible, for example, for adjusting the seat level.

BRIEF DESCRIPTION OF THE DRAWING

The above and other objects, features and advantages of the present invention will now be described in more detail with reference to the accompanying drawing, in which.

DETAILED DESCRIPTION OF PREFERRED EMBODIMENTS

Figure 1:
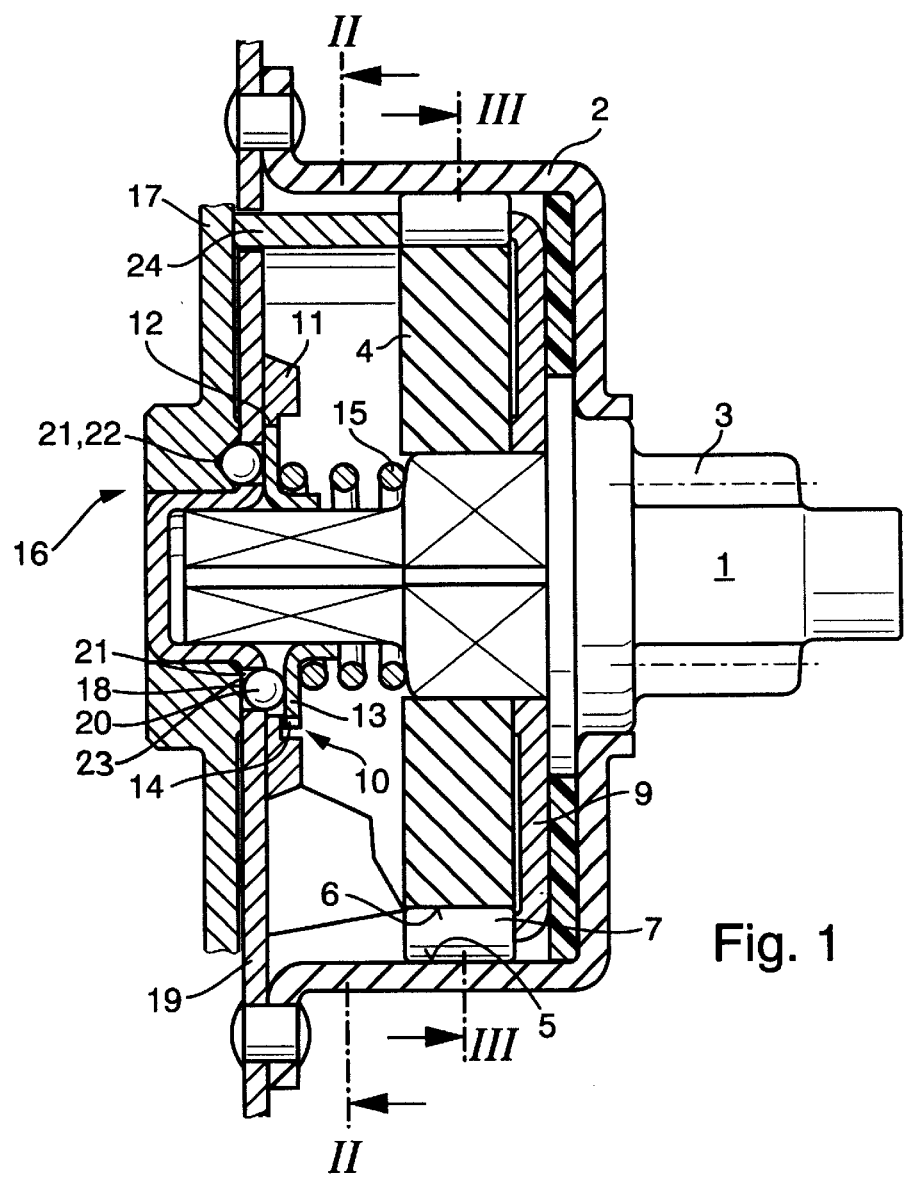
FIG. 1 is a longitudinal section of a shiftable clamping-type locking mechanism according to the invention.

Throughout all the Figures, same or corresponding elements are generally indicated by same reference numerals.

Turning now to the drawing, and in particular to FIG. 1, there is shown a shiftable longitudinal section of a clamping-type locking mechanism according to the invention, suitable e.g. for vertically adjusting a seat. A shaft 1 is rotatably supported in a housing 2. Outside the housing 2, the shaft 1 is provided with an output pinion 3 which meshes with a not shown tooth profile, whereby a rotation of the shaft 1 results in a vertical adjustment of the seat. A clamping ring 4 is securely fixed on the shaft 1 and prevented from rotating relative thereto. Formed at the inner surface area of the housing 2 is a cylindrical clamping track 5 which is opposed by clamping ramps 6 formed about the circumference of the output pinion 3. Clamping rollers 7 are arranged between the clamping ring 4 and the housing 2 and retained in pockets 8 of a cage 9 which is part of a control unit to move the clamping rollers 7 between a clamped position and a release position, as will be described furtherbelow.

Figure 3:
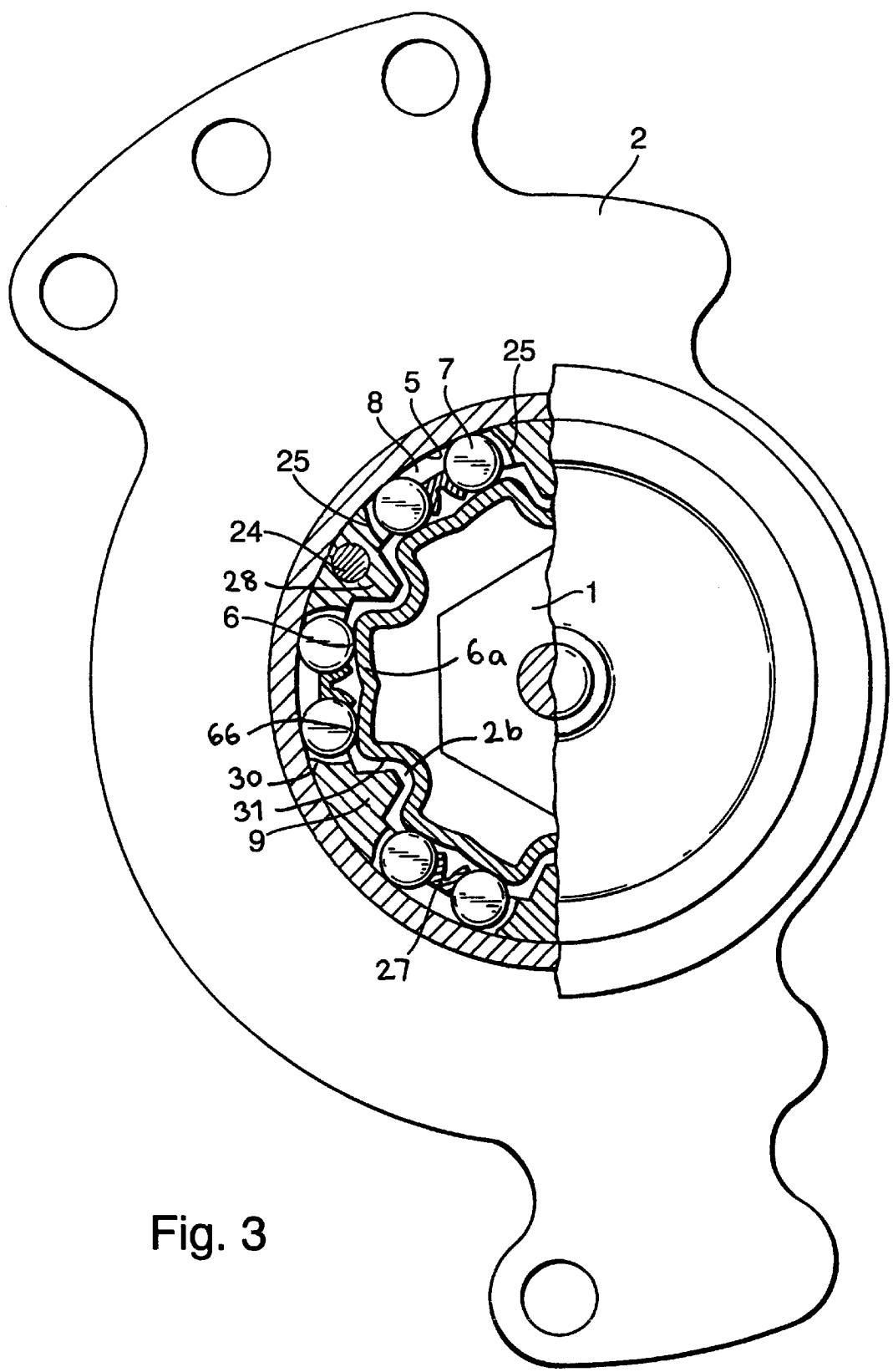
FIG. 3 is a partial sectional view of the shiftable locking mechanism taken along the line III-III of FIG. 1.

As best seen in FIG. 3, the ramps 6 are spaced from one another by valleys 26, with each ramp 6 being comprised of two neighboring ramp sections 6a, 6b which are inclined in opposite directions so as to define an obtuse angle therebetween. Two clamping rollers 7 are so arranged on each ramp 6 that one roller 7 travels on ramp section 6a and the other roller 7 travels on ramp section 6b. Positioned between the clamping rollers 7 for each ramp 6 is a spring element 27 which tends to push apart the clamping rollers 7 to thereby keep them in a clamped position with the inner track 5 of the housing 2 and the ramp sections 6a, 6b. The cage 9 is formed with claws 28 which project axially into the area of the valleys 26 at clearance in the circumferential directions, thereby bounding wedge-shaped clamping gaps in conjunction with the track 5 and the ramp 6 for receiving the clamping rollers 7 under tension by the springs 27. The cage 9 has wall surfaces 25 which bound the pockets 8 and are formed in one piece with a lugs 30 for engaging behind the clamping rollers 7 in circumferential direction, whereby the clearance in circumferential direction between the pocket walls 25 and their neighboring clamping rollers 7 is smaller than the clearance between the claws 28 and peripheral walls 31 of the valleys 26. As neighboring ramp sections 6a, 6b of the ramps 6 are inclined in opposite directions and thus the wedge peaks of the wedge-shaped clamping gap point in opposite directions, a rotation of the shaft 1 relative to the housing 2 is prevented in both directions of rotation in the shown illustration.

Figure 2:
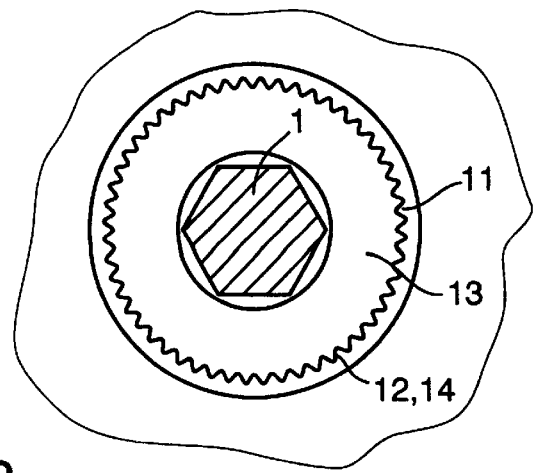
FIG. 2 is a partial sectional view of the shiftable locking mechanism taken along the line II—II of FIG. 1.

As further shown in FIG. 1, the locking mechanism is provided with a coupling unit, generally designated by reference numeral 10, for realizing a detachable connection between the shaft 1 and the housing 2 in a form-fitting manner. The coupling unit 10 includes a gear ring 11 which is mounted to the housing 2 and has inner teeth 12 for meshing with outer teeth 14 of a gear 13, as shown in particular in FIG. 2. The gear 13 is so securely mounted on the shaft 1 so as to be shiftable in axial direction but not rotatable relative to the shaft 1. A helical compression spring 15 extends between the shaft 1 and the gear 13 to load the gear 13 in the direction of the gear rim 11.

In the illustration of FIG. 1, the upper half shows the coupling unit 10 in engaged position and the lower half shows the coupling unit 10 in disengaged position. A comparison shows that the teeth 12 mesh with teeth 14, when the coupling unit 10 is engaged, and are out of mesh, when the coupling unit 10 is disengaged.

The coupling unit 10 is operated by an actuating device, generally designated by reference numeral 16, which includes an actuator in the form of a lever 17 which is arranged concentric to and pivotable relative to the shaft 1. The housing 2 has a housing wall 19 which is formed with throughbores 18 for receiving balls 20 almost without circumferential clearance. The balls 20 are under tension of the helical compression spring 15 and clamped between an end face of the gear 13 and a cam surface 21 of the lever 17. The cam surface 21 for cooperation with each of the balls 20 is comprised of a ramp 22 and a support area 23 which follows the ramp 22. The ramp 22 extends in circumferential direction and slopes with respect to a plane in which the lever is pivoted, with the support area 23 extending parallel to this plane. When the coupling unit 10 is engaged, the balls 20 are pressed against the ramp 22. Conversely, when the coupling unit 10 is disengaged, the balls 20 are urged against the support area 23. Pivoting the lever 17 in circumferential direction causes the balls 22 to travel along the ramps 22 until reaching the support areas 23. When traveling from the ramps 22 to the support areas 23, the balls 20 are shifted axially in the direction of the gear 13, whereby the gear 13 is displaced in opposition to the force of the helical compression spring 15 for detachment from the inner teeth 12 of the gear rim 11.

The lever 17 is connected to the clamping ring 4 by a crossbar 24 for realizing conjoint pivoting movements. In the phase of disengagement of the coupling unit 10, the lever 17 together with the crossbar 24 and the cage 9 commonly pivot, whereby initially the clamping rollers 7 remain in resilient contact with the track 5 and the ramps 6 as a consequence of the clearance by which the clamping rollers 7 are retained in the cage pockets 8. Once the coupling unit 10 is disengaged and the lever 17 and the cage 9 are further turned, the clamping rollers 7 impact on the wall surfaces 25 of the cage pockets 8. A continued common rotation of the lever 17 and the cage 9 results in a disengagement of the clamping rollers 7 from the wedge-shaped clamping gaps. In this position, a rotation of the shaft 1 relative to the housing 2 is possible to realize an adjustment of the seat level.

When the coupling unit 10 is engaged, the cage 9 occupies the position shown in FIG. 3, in which the clamping rollers 7 are resiliently urged against the ramps 6 and the track 5 under the action of the springs 27. In this situation of the locking mechanism, an undesired slip of the shaft 1 relative to the housing 2 is positively eliminated. Torque acting on the shaft 1 is introduced into the housing 2 via the clamping rollers 7. As a consequence, the clamping rollers 7 are subject to smaller loads when the torque decreases, so that the clamped formation loosens. This may result in conventional locking mechanisms to a rotation of the shaft relative to the housing when the torque loads change because the clamping force between the shaft and the housing is significantly reduced during zero passage upon such an oscillation, ultimately leading to a slip. By incorporating a coupling unit 10 in the locking mechanism in accordance with the present invention, a slip of the shaft relative to the housing is reliably eliminated as the shaft 1 is positively connected with the housing 2. The coupling unit 10 is subject to loads in slip situations. Greater torque loads are transmitted via the clamping rollers 7.

While the invention has been illustrated and described as embodied in a shiftable clamping-type locking mechanism, it is not intended to be limited to the details shown since various modifications and structural changes may be made without departing in any way from the spirit of the present invention.

What is claimed as new and desired to be protected by Letters Patent is set forth in the appended claims:

1. A shiftable locking mechanism, comprising:
   a first element defining a track;
   a second element defining a track;
   a plurality of clamping members arranged between the tracks of the first and second elements and so spring-biased as to seek a clamped position;
   a control unit acting on the first and second elements for moving the clamping members from the clamped position into a release position in which the clamping members are disengaged from the tracks so that the first and second elements are freely movable relative to one another; and
   a coupling unit for detachably and positively connecting the first and second elements to one another.

2. The locking mechanism of claim 1 wherein the clamping members are selected from the group consisting of ball and roller.

3. The locking mechanism of claim 1 wherein the coupling unit is so incorporated as to be disengaged when the clamping members are in the release position and engaged when the clamping members are in the clamped position.

4. The locking mechanism of claim 2, and further comprising an actuating device for operating the control unit and the coupling unit.

5. The locking mechanism of claim 4 wherein the actuator is in a neutral position when the clamping members occupy the clamped position and the coupling unit is engaged.

6. The locking mechanism of claim 1 wherein the first element has a tooth profile and the second element has a tooth profile, said tooth profiles of the first and second elements being shiftable relative to one another for realizing an engagement between the tooth profiles.

7. The locking mechanism of claim 5 wherein the first element includes a shaft and a gear forming the tooth profile of the first element and so secured on the shaft as to be prevented from rotating relative to the shaft but allowed to shift in axial direction relative to the shaft, said shaft being rotatably mounted with respect to the second element.

8. The locking mechanism of claim 7, and further comprising an actuating device for operating the control unit and the coupling unit, said actuating device including a rotatably mounted actuator; and an indexing mechanism positioned between the actuator and the gear for converting a rotational movement of the actuator into an axial movement of the gear.

9. The locking mechanism of claim 8 wherein the actuator has a cam surface for support of the gear, said cam surface including at least one ramp and a support area which follows the ramp, said ramp being inclined in rotational direction with respect to a plane in which rotational movement of the actuator take place, with the support are extending parallel to said plane.

10. The locking mechanism of claim 9 wherein the indexing mechanism includes at least one ball interposed between the gear and the cam surface, said gear being urged against the cam surface via the ball.

11. The locking mechanism of claim 10 wherein the second element is formed with a bore for receiving the ball, with the ball bearing against the cam surface and the gear.

12. The locking mechanism of claim 8, and further comprising a helical compression spring extending between the shaft and the gear for loading the gear against the actuator.

13. The locking mechanism of claim 1 wherein the first element is so mounted as to rotate relative to the second element about a pivot axis, said track of the second element being of cylindrical configuration and positioned concentrically to the pivot axis, said track of the first element being formed by circumferentially spaced clamping ramps which confront the track of the second element, said control unit including a rotatable cage for retaining the clamping members, said clamping members being positioned under spring tension in wedge-shaped clamping gaps bounded by the ramps of the first element and the track of the second element, wherein a rotation of the cage moves the clamping members from the clamped position into the release position.

14. The locking mechanism of claim 13, and further comprising an actuating device for operating the control unit and the coupling unit, said actuating device including a rotatably mounted actuator; and an indexing mechanism positioned between the actuator and the gear for converting a rotational movement of the actuator into an axial movement of the gear, said actuator being linked to the cage for realizing a conjoint rotational movement.

* * * * *